(12) United States Patent
Cogswell

(10) Patent No.: US 8,978,591 B2
(45) Date of Patent: Mar. 17, 2015

(54) PET TOY

(71) Applicant: Jesse G. Cogswell, Redondo Beach, CA (US)

(72) Inventor: Jesse G. Cogswell, Redondo Beach, CA (US)

(*) Notice: Subject to any disclaimer, the term of this patent is extended or adjusted under 35 U.S.C. 154(b) by 0 days.

(21) Appl. No.: 13/919,858

(22) Filed: Jun. 17, 2013

(65) Prior Publication Data
US 2014/0000532 A1 Jan. 2, 2014

Related U.S. Application Data

(60) Provisional application No. 61/664,916, filed on Jun. 27, 2012.

(51) Int. Cl.
*A01K 15/02* (2006.01)
(52) U.S. Cl.
CPC ............. *A01K 15/027* (2013.01); *A01K 15/025* (2013.01)
USPC .......................................................... 119/708
(58) Field of Classification Search
USPC .................... 119/707, 708, 702, 711; 446/227
See application file for complete search history.

(56) References Cited

U.S. PATENT DOCUMENTS

| | | | |
|---|---|---|---|
| 2,481,559 A * | 9/1949 | Ashbaugh | 119/797 |
| 3,564,759 A * | 2/1971 | Buttermore | 446/227 |
| 4,517,922 A * | 5/1985 | Lind | 119/708 |
| 4,534,316 A | 8/1985 | Bowlsby | |
| 4,722,299 A | 2/1988 | Mohr | |
| 4,803,953 A | 2/1989 | Graves | |
| 4,907,537 A | 3/1990 | Shirk | |
| 4,928,632 A | 5/1990 | Gordon | |
| 4,940,018 A | 7/1990 | Edling | |
| D309,964 S | 8/1990 | Viner et al. | |
| 4,960,075 A | 10/1990 | Klatt | |
| 5,009,193 A | 4/1991 | Gordon | |
| D318,150 S | 7/1991 | Eitel et al. | |
| 5,045,014 A | 9/1991 | Harkins | |
| 5,275,127 A | 1/1994 | Leopold | |
| 5,322,036 A * | 6/1994 | Merino | 119/707 |
| 5,351,650 A | 10/1994 | Graves | |
| 5,467,740 A | 11/1995 | Redwine | |
| 5,579,725 A | 12/1996 | Boshears | |
| 5,595,141 A | 1/1997 | Udelle et al. | |
| 5,611,297 A | 3/1997 | Veloce | |
| 5,657,721 A * | 8/1997 | Mayfield et al. | 119/707 |
| 5,673,652 A | 10/1997 | Witte | |
| 5,682,838 A | 11/1997 | Reich | |
| 5,743,215 A | 4/1998 | Zeff | |
| 5,778,825 A | 7/1998 | Krietzmen et al. | |
| 5,803,786 A * | 9/1998 | McCormick | 446/227 |
| 5,823,844 A * | 10/1998 | Markowitz | 446/175 |
| 5,924,387 A * | 7/1999 | Schramer | 119/708 |

(Continued)

OTHER PUBLICATIONS

U.S. Appl. No. 29/414,670, filed Mar. 1, 2012, Cogswell.

*Primary Examiner* — Yvonne Abbott
(74) *Attorney, Agent, or Firm* — Knobbe, Martens, Olson & Bear, LLP

(57) ABSTRACT

A pet toy comprising a rod that has a proximal end and a distal end. The rod becomes increasingly flexible from the proximal end to the distal end. The pet toy further comprises a flexible line member connected to the distal end where a ratio of a length of the rod and a length of the flexible line member can be from about 5:1 to about 50:1. The connection between the distal end and the flexible line member comprises a pin with a needle and a head where the needle can be inserted into the distal end, and a connector that is mounted on the head.

21 Claims, 3 Drawing Sheets

(56) References Cited

U.S. PATENT DOCUMENTS

| | | | |
|---|---|---|---|
| 5,941,196 A * | 8/1999 | Domanski | 119/708 |
| 5,951,360 A * | 9/1999 | Fearon et al. | 446/227 |
| 6,039,628 A | 3/2000 | Kusmiss et al. | |
| D426,036 S | 5/2000 | Willinger et al. | |
| 6,155,905 A | 12/2000 | Truax | |
| 6,314,913 B1 | 11/2001 | Lettau et al. | |
| 6,360,694 B1 * | 3/2002 | Noto | 119/707 |
| 6,413,141 B1 * | 7/2002 | Putney | 446/227 |
| 6,447,362 B2 * | 9/2002 | Khamphilavong et al. | 446/227 |
| 6,510,817 B2 | 1/2003 | Horvath | |
| 6,591,785 B1 | 7/2003 | Boshears | |
| 6,743,072 B2 * | 6/2004 | Nelson et al. | 446/490 |
| 6,883,465 B2 | 4/2005 | Telford et al. | |
| 6,892,675 B1 | 5/2005 | Comerford | |
| D513,546 S | 1/2006 | Comerford | |
| 7,025,654 B2 * | 4/2006 | Oren et al. | 446/227 |
| 7,121,230 B2 | 10/2006 | Ritchey | |
| 7,172,486 B2 * | 2/2007 | Drosendahl et al. | 446/81 |
| 7,562,639 B2 | 7/2009 | Ritchey | |
| 7,621,235 B2 | 11/2009 | Genitrini | |
| 7,823,541 B2 | 11/2010 | Comerford | |
| 7,900,584 B2 * | 3/2011 | Suring et al. | 119/708 |
| D645,215 S | 9/2011 | Lee | |
| 8,011,326 B2 | 9/2011 | del Pinal et al. | |

* cited by examiner

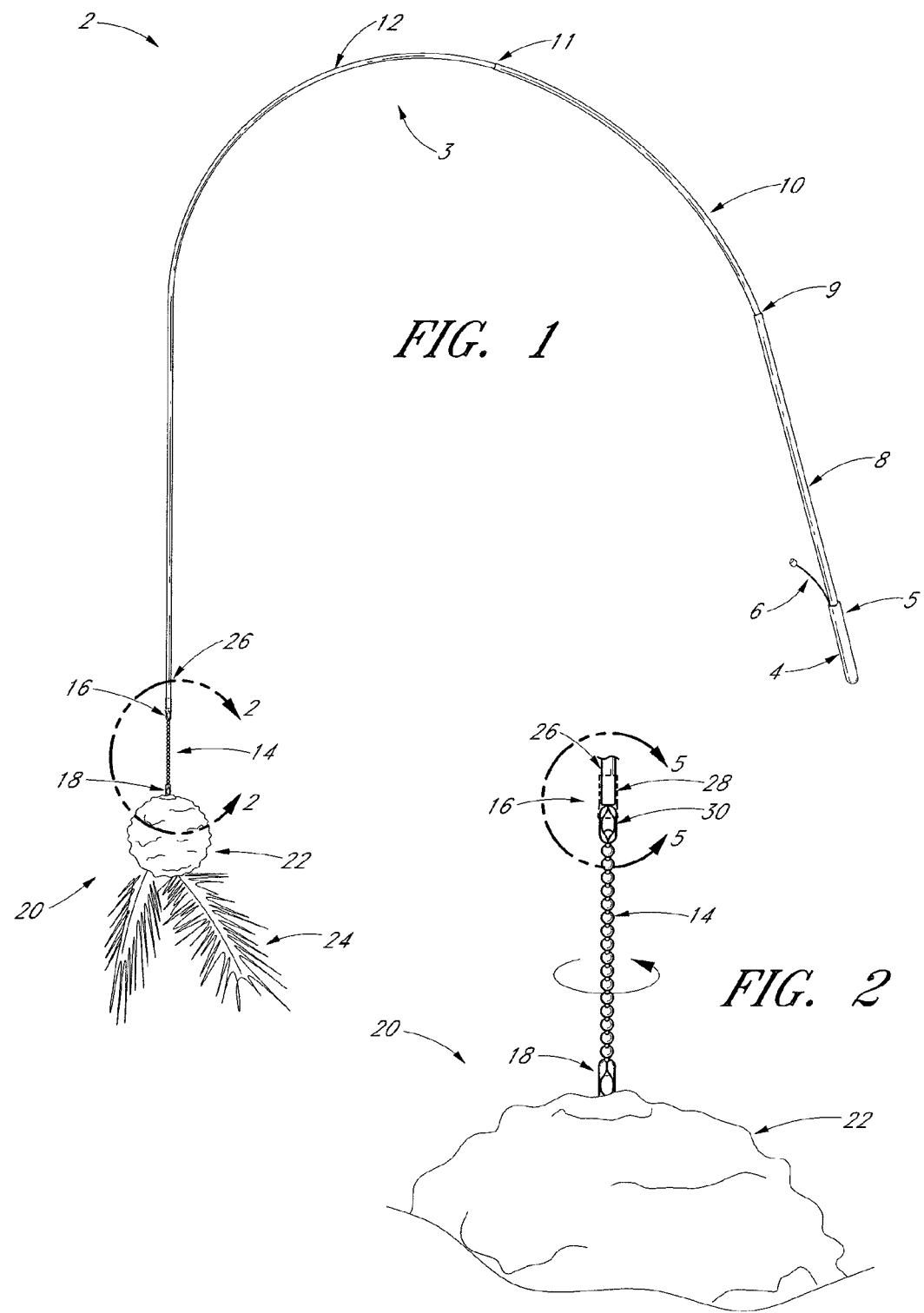

PET TOY

CROSS-REFERENCE TO RELATED APPLICATIONS

This application is a continuation of U.S. application Ser. No. 61/664,916, filed Jun. 27, 2012, titled PET TOY, the entire contents of which are incorporated by reference herein and made a part of this specification.

BACKGROUND

1. Field of the Inventions

These inventions generally relate to pet toys. More particularly, the inventions generally relate to a pet toy for exercising and playing with cats.

2. Description of the Related Art

There are many pet toys for exercising and playing with a pet. Pet owners, particularly cat owners, exercise and play with their pets by dangling various objects in front of them. In cats, this arouses instinctual as well as playful behavior that is desired by pet owners.

SUMMARY

Conventionally, pet toys for cats have been manufactured using string, twine, or similar materials. Using string or twine, particularly of relatively long length, presents problems of knots and tangling. These problems disrupt play, can break the toy, and even tangle around a cat. Thus, pet toys with long string or twine are not only inefficient, but can also be ineffective in fulfilling a pet owner's desire to play and exercise his or her cat. The disclosed embodiments herein help alleviate these issues.

In certain embodiments, the pet to can be an interactive toy designed to create unpredictable motion that is intriguing to cats. Cats can include domesticated cats as well as zoo animals such as, for example, lions, and tigers. The pet toy can be waived or zipped through the air like a bird or dragged across the floor like a mouse to arouse instinctual as well as playful behavior in cats. When a cat has the pet toy object in its possession, the pet owner can gently tug at the pet toy to play with the cat. When the pet owner cannot actively play with the cat, the pet toy can be strapped to a chair leg or other stationary objects with rubber bands, tape, bungee cords, or other similar means. With the pet toy strapped into place, cats can develop a relationship with it such as sometimes growling at it, hiding, and then attacking, or laying under it and batting at it with his or her paws.

Certain embodiments of the pet toy can create unpredictable motion with a flick of the pet owner's wrist. Unpredictable motion can be intriguing to cats because a cat's brain can analyze distances, trajectories, and motion. When a cat recognizes that motion is repetitive, it can get bored. The pet toy disclosed herein can have random enough action to create unpredictable motion that is intriguing to cats and keeps their attention.

In other embodiments, the pet toy can be used with dogs. For instance, bird-hunting dogs can be trained by attaching appropriate feathers or other objects to the end of the pet toy and using the pet toy as a lure to entice dogs to chase it. In some embodiments, the pet toy can be used with other animals that can be entertained as described herein.

One embodiment can be a pet toy comprising a rod that has a proximal end and a distal end. The rod becomes increasingly flexible from the proximal end to the distal end. One way of achieving increasing flexibility of the rod can be a decrease in the cross-sectional diameter of the rod from the proximal end to the distal end. In some embodiments, the pet toy is relatively longer than, for example, a pet owner's arm. The overall shape of pet toy or the rod can be substantially an arcuate shape when the pet owner holds the handle of the proximal end substantially upright or vertically. The arcuate shape can be such that the distal end of the rod is about the same or similar height as the handle such as, for example, the distal end of the rod being substantially horizontally level with the proximal end. The increasing flexibility, relative long length, and/or substantially arcuate shape can cause a disassociation between the cat's perception of the pet toy motion and the owner controlling the pet toy. The cat's perception that the pet toy is independent from the owner's controlling motions can enhance the cat's belief that the pet toy is alive.

Another way to achieve increasing flexibility of the rod can be to form the rod from a plurality of sections where the cross-sectional diameter of each section decreases from the proximal end to the distal end. Yet another way to achieve increasing flexibility of the rod can be to use different materials of varying rigidity for each section where rigidity of the material of each section decreases from the proximal end to the distal end. Further, the length of each section can increase from the proximal end to the distal end as another way of achieving increasing flexibility of the rod. Sections can be configured to fit into each other at junctions upon assembly of the rod where a section with smaller cross-sectional diameter fits into the adjacent section closer to the proximal end with a larger cross-sectional diameter.

The junctions (connections) connecting the sections can be pulled apart to dismantle or disassemble the rod. An elastic cord can run along at least a part of the length of the rod to hold together the (separable) sections at the connections. The elastic cord can hold the sections in close proximity when the rod is disassembled, which can aid quick assembly. When disassembled, a tie wrap can secure the sections to each other.

The pet toy further comprises a flexible line member connected to the distal end where a ratio of a length of the rod and a length of the flexible line member can be from about 5:1 to about 50:1. The flexible line member is more flexible than any of the sections of the rod. The flexible line member can allow for free rotation of an object connected to the end of the flexible line member. Free rotation can be 360° degree rotation of the object while connected to the flexible line member without tangling or forming knots in the flexible line member. The connection between the distal end and the flexible line member comprises a pin with a needle and a head where the needle can be inserted into the distal end, and a connector that is mounted on the head. A heat shrink sleeve can secure the connector to the head.

BRIEF DESCRIPTION OF THE DRAWINGS

The above-mentioned and other features of the inventions disclosed herein are described below with reference to the drawings of the preferred embodiments. The illustrated embodiments are intended to illustrate, but not to limit the inventions. The drawings contain the following figures:

FIG. 1 illustrates a side view of a pet toy;

FIG. 2 illustrates a connection between a rod of the pet toy and a toy object;

DETAILED DESCRIPTION

Figure 3:
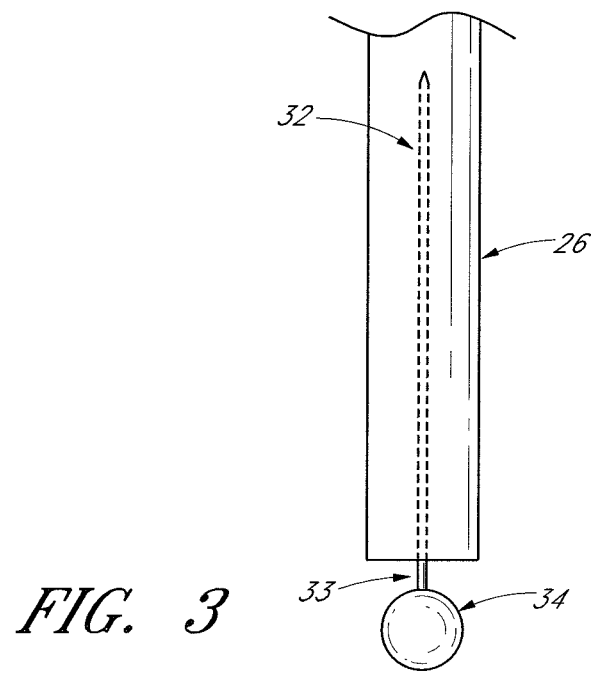
FIG. 3 illustrates insertion of a pin with a needle and a head into the rod.

While the present description sets forth specific details of various embodiments, it will be appreciated that the description is illustrative only and should not be construed in any way as limiting. Additionally, although particular embodiments of the present inventions may be disclosed or shown in the context of a cat toy, such embodiments can be used as both cat toys and toys for other pets. Further, various applications of such embodiments and modifications thereto, which may occur to those who are skilled in the art, are also encompassed by the general concepts described herein.

FIG. 1 shows a side view of an embodiment of an assembled pet toy 2. The pet toy 2 can have a rod 3 with a proximal end 4 and a distal end 26. The proximal end 4 can have a grip or handle 5 for the user's hand. The overall shape of the pet toy 2 from the proximal end 4 and the distal end 26 can form substantially an arch (arcuate shape) when a user holds the proximal end to be substantially vertical as depicted in FIG. 1. The arcuate shape can be such that the distal end 26 is about the same or similar height as the handle 5 such as, for example, the distal end 26 being substantially horizontally level with the proximal end 4. Thus, the rod can form the substantially arcuate shape when the distal end 26 is freely suspended. The proximal end 4 can have a tie wrap 6 that is used to wrap around the flexible line member 14 or sections of the rod 3 for easy storage when the pet toy 2 is not in use.

In certain embodiments, the rod 3 can have three sections: a base section 8, a midsection 10, and a tip section 12. In some embodiments, the rod 3 can have two sections: a base section 8 and a tip section 12. The base section 8 can have a larger cross-sectional diameter than the midsection 10. The midsection 10 can have a larger cross-sectional diameter than the tip section 12.

In some embodiments, the transition from base section 8 to midsection 10 to tip section 12 cross-sectional diameters can be abrupt or a step change as illustrated by connection 9 and connection 11 of FIG. 1. In other embodiments, the transition or cross-sectional diameter change can be substantially smooth and gradual over the length of the rod 3. In yet other embodiments, the change in cross-sectional diameter can be a combination of abrupt and smooth transitions.

In some embodiments, the rod 3 may be a solid and/or single piece with increasing flexibility or decreasing rigidity from the proximal end 4 to the distal end 26. For example, in some embodiments, the rod 3 will not have connection 9 and/or connection 11. In some embodiments, the rod 3 can have connection 9 and/or connection 11 that are not separable as described herein. In some embodiments, the rod 3 may be a solid and/or single piece of constant cross-sectional width with increasing flexibility or decreasing rigidity from the proximal end 4 to the distal end 26. For example, increasingly flexible or decreasingly rigid material as described herein can be used from the proximal end 4 to the distal end 26.

In some embodiments, the rod 3 may be a solid and/or single piece with a tapering cross-sectional width. For example, the cross-sectional width can decrease from the proximal end 4 to the distal end 26. The decrease in cross-sectional width can be a step change at connection 9, connection 11 and/or any other similar connection. In some embodiments, the decrease in cross-sectional diameter can be a smooth constant taper from the proximal end 4 to the distal end 26. In some embodiments, the decrease in cross-sectional can include step changes at connection 9, connection 11, and/or any other similar connection and a substantially constant taper from the proximal end 4 to the distal end 26 for one or more of the base section 8, midsection 10, and/or tip section 12. For example, one or more of the base section 8, midsection 10, and/or tip section 12 may have a substantially constant taper or decrease in cross-sectional diameter from the proximal end 4 to the distal end 26 while the other one or more of the base section 8, midsection 10, and/or tip section 12 may have a constant cross-sectional diameter.

The rod 3 and/or sections of the rod can be fabricated using any suitable or known process or processes, including injection molding, compression molding, extrusion, and/or thermoforming techniques, including any combination thereof. In some embodiments, sections of the rod 3 can be joined using any suitable or known process or processes, including permanent adhesive, thermal bonds, ultrasonic bonds, spot welds, i.e., thermal weld points, a stitch or stitches, strip welds, tacks formed by crimping, and/or press fit, shrink fit, sliding fit, interference fit, and/or snap fit mechanisms, and so forth, including any combination thereof. In some embodiments, separable sections as described herein can be joined using any suitable or known process or processes, including press fit, shrink fit, sliding fit, interference fit, and/or snap fit mechanisms, including any combination thereof.

The base section 8 can be more rigid than the midsection 10. Further, the midsection 10 can be more rigid than the tip section 12. The change in rigidity can be in part due to the change in cross-sectional diameter. In some embodiments, the change in rigidity can help form the substantially arcuate shape of the pet toy 2.

In some embodiments, different rigidity or flexibility in the sections of the rod 3 can also be achieved via the use of different types of material. Some embodiments, for instance, can utilize a wooden or metallic base section 8 for complete rigidity while utilizing flexible nylon tubes for the midsection 10 or tip section 12. In other embodiments, the midsection 10 can also be made out of metal or wood. In certain embodiments, the tip section 12 can be made of flexible polymer material such as nylon. In other embodiments, all of the sections of the rod 3—base section 8, midsection 10, and tip section 12—can be made of flexible polymer material.

In other embodiments, the rod 3 can be a constant cross-sectional diameter. The base section 8, midsection 10, and tip section 12 can be made of different materials with different strength and flexibility characteristics. Again, with the use of different materials such as wood, metal, or polymer rods or tubes, the transition from more rigid to less rigid or from less flexible to more flexible from the proximal end 4 to the distal end 26 can be achieved where the rod 3 has a constant cross-sectional diameter. In certain embodiments, the change in rigidity or flexibility can be accomplished by a combination of both a change in cross-sectional diameters and the use of different materials with different strength and flexibility characteristics.

In some embodiments, the base section 8, midsection 10, and tip section 12 can be made from tubes with a hole down the center. In other embodiments, the sections can be made up of solid poles. The connections 9 and 11 can be detachable where the midsection 10 slides into a notch in the base section 8 and the tip section 12 slides into a notch in the midsection 10 to form a single rod 3 as shown in FIG. 1 comprising separable sections. The connections 9 and 11 can be pulled apart to dismantle or disassemble the rod.

In certain embodiments, the separable sections can be held together or secured by a flexible and stretchable line member such as an elastic cord that is disposed along at least a part of the length of the rod 3. The elastic cord can keep the separable sections together when the rod is assembled or in proximity to each other when the separable sections of the rod are pulled apart (separated) or disassembled, which can aid quick assembly. In some embodiments, the separable sections of the rod 3 will self-assemble when the pet toy is unfolded, or the distal end 26 or flexible line member 14 is unwrapped from the tie wrap 6. When the rod 3 is composed of solid poles, sections can be fitted together and secured via cords, glue, or other suitable securing means to hold the poles in their corresponding notches.

In certain embodiments, the base section 8 can be shorter than the midsection 10. Further, the midsection 10 can be shorter than the tip section 12. In other embodiments, the base section 8 can be the same length as the midsection 10. The tip section 12 can be longer than the base section 8 or the midsection 10. In yet other embodiments, all of the sections of the rod 3—base section 8, midsection 10, and tip section 12—can be the same length. The overall length of the rod 3 can be from about 5 to about 50 times the length of the flexible line member 14 connecting the toy object 20.

In certain embodiments, the overall length of the rod 3 can range from about 3 to about 15 feet long, including to about 4, 5, 6, 7, 8, 9, 10, 11, 12, 13, and 14 feet, including ranges bordered and including the foregoing values. The length of the base section 8 can range from about 12 to about 36 inches long, including to about 13, 14, 15, 16, 17, 18, 19, 20, 21, 22, 23, 24, 25, 26, 27, 28, 29, 30, 31, 32, 33, 34, and 35 inches, including ranges bordered and including the foregoing values. The diameter of the base section 8 can range from about $1/8$ to about 5 inches, including to about $1/4$, $3/8$, $1/2$, $5/8$, $3/4$, $7/8$, 1, 1.25, 1.5, 1.75, 2, 2.25, 2.5, 2.75, 3, 3.25, 3.5, 3.75, 4, 4.25, 4.5, and 4.75 inches, including ranges bordered and including the foregoing values.

In certain embodiments, the length of the midsection 10 can range from about 12 to about 36 inches, including to about 13, 14, 15, 16, 17, 18, 19, 20, 21, 22, 23, 24, 25, 26, 27, 28, 29, 30, 31, 32, 33, 34, and 35 inches, including ranges bordered and including the foregoing values. The diameter of the midsection 10 can range from about $1/10$ to about 4 inches, including to about $1/8$, $1/4$, $3/8$, $1/2$, $5/8$, $3/4$, $7/8$, 1, 1.25, 1.5, 1.75, 2, 2.25, 2.5, 2.75, 3, 3.25, 3.5, and 3.75 inches, including ranges bordered and including the foregoing values.

In certain embodiments, the length of the tip section 12 can range from about 12 to about 60 inches, including to about 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, and 59 inches, including ranges bordered and including the foregoing values. The diameter of the tip section 12 can range from about $1/12$ to about 3 inches, including to about $1/10$, $1/8$ $1/4$ $3/8$, $1/2$, $5/8$, $3/4$, $7/8$, 1, 1.25, 1.5, 1.75, 2, 2.25, 2.5, and 2.75 inches, including ranges bordered and including the foregoing values.

At the tip section 12 or the distal end 26 of the rod 3, a toy object 20 can be connected via a flexible line member 14. In some embodiments, the toy object 20 can be a ball 22 and feathers 24 attached together. In other embodiments, the toy object 20 can be just a ball 22 or just feathers 24. In yet other embodiments, the toy object 20 can be anything that attracts a cat's attention such as a stuffed mouse figurine.

In certain embodiments, the flexible line member 14 can be a beaded chain which is not only flexible, but also allows for 360° freedom of rotation. A flexible line member 14 with 360° freedom of rotation can alleviate the problems of knots and tangling discussed above. The diameter of the beaded chain can range from about $1/16$ to about 2 inches, including to about $1/12$, $1/8$ $1/4$ $3/8$, $1/2$, $5/8$, $3/4$, $7/8$, 1, 1.25, 1.5, and 1.75 inches, including ranges bordered and including the foregoing values.

In certain embodiments, the flexible line member 14 can be a link chain or a string. In other embodiments, the flexible line member 14 can be a combination of a beaded chain, a link chain, or a string. When a string is used as part of the flexible line member 14, then the ratio of the length of the rod 3 to the length of the flexible line member 14 can be increased to at least about 10:1 to alleviate the problems of knots and tangling discussed above.

In some embodiments, the length of the flexible line member 14 can range from about $1/2$ to about 24 inches, including to about $3/4$, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5 7.75, 8, 8.5, 9, 9.5, 10, 10.5, 11, 11.5, 12, 13, 14, 15, 16, 17, 18, 19, 20, 21, 22, and 23 inches, including ranges bordered and including the foregoing values. In certain embodiments, using a short flexible line member 14 can alleviate the problems of knots and tangling discussed above. In other embodiments, using a flexible line member 14 that is both short and has 360° freedom of rotation can further alleviate the problems of knots and tangling.

The combination of decreasingly rigid or increasingly flexible sections of the rod 3 from the proximal end 4 to the distal end 26 and a relatively shorter flexible line member 14 connecting the toy object 20 can create unpredictable motions of the toy object 20 or motion that can closely mimic unpredictability when either the toy object 20 comes in contact with force such as a moving cat's paw or a user manipulating any section of the rod 3. Manipulation can include waiving the pet toy 2 like a wand. Other methods of manipulation can include zipping the pet toy 2 through the air like a bird or dragging it across the floor like a mouse. In some embodiments, the unpredictable motion can be further achieved by the relatively long length of the pet toy 2 relative to an owner's arm and the substantially arcuate shape of the pet toy 2. The features described herein can help disassociate the cat's perception of the owner's manipulation of the pet toy from the actual motion of the pet toy 2.

The unpredictable or random motion helps peak a cat's curiosity for exercising and playing the cat. This unpredictable or random motion can be produced by either the pet owner manipulating the pet toy 2 as discussed above or attaching the proximal end 4 of the pet toy 2 to a stationary object while the pet owner or cat apply force to the toy object 20 or anywhere along the rod 3 length. The pet toy 2 can be strapped to stationary objects, such as a chair leg, with rubber bands, tape, bungee cords, or other similar means. In some embodiments, the pet toy 2 can be strapped to moving objects such as, for example, a weighted bob that returns to a center when disturbed. Other moving objects can include a spring that returns to its (and the attached pet toy 2) resting position after being disturbed. Other moving objects can include mechanical movement devices that function similarly to the weighted bob or spring as described herein and/or that have movement induced by an electrical motor.

FIG. 2 illustrates the distal end connection 16 between the toy object 20 and the distal end 26 via the flexible line member 14. As illustrated in the embodiment of FIG. 2, the flexible line member 14 can be a beaded chain. The beaded chain allows for the use of a beaded chain connector 30, facilitating the distal end connection 16 and toy object and flexible line member connection 18. In some embodiments, the distal end connection 16 can be formed with any suitable or know process or processes, including permanent adhesive, thermal bonds, ultrasonic bonds, spot welds, i.e., thermal weld points, a stitch or stitches, strip welds, tacks formed by crimping, and/or press fit, shrink fit, sliding fit, interference fit, and/or snap fit mechanisms, and so forth, including any combination thereof FIG. 3 illustrates an embodiment of a possible configuration for forming a distal end connection 16. The distal end connection 16 is a connection between the distal end 26 of the rod 3 and the flexible line member 14. A method of assembly for the distal end connection 16 can include inserting a pin 33 into the distal end 26 of the rod 3. The pin 33 can have a needle 32 and a head 34. In some embodiments, the pin 33 can be a quilting pin. For example, the pin 33 can be a #22 quilting pin.

The method can further include inserting the needle 32 into the distal end 26 while leaving sufficient distance between the head 34 and the distal end 26 for a beaded chain connector 30. The sufficient distance between the head 34 and the distal end 26 can range from about 1/48 to about 1/4 inches, including to about 1/40, 1/32, 1/24, 1/16, and 1/8 inches, including ranges bordered and including the foregoing values. The diameter of the head 34 can range from about 1/12 to about 3/8 inches, including to about 1/10, 1/8, and 1/4 inches, including ranges bordered and including the foregoing values. The diameter of the head 34 may be limited by a predetermined size of the beaded chain connector 30. The length of the needle 32 can range from about 1/2 to about 2.5 inches, including to about 3/4, 1, 1.25, 1.5, 1.75, 2, and 2.25 inches, including ranges bordered and including the foregoing values.

In some embodiments, the needle 32 can be inserted and glued into an existing hole in the distal end 26 where the tip section 12 is a tube with a correspondingly small hole for the glue to be able to bond the needle 32 to the tube hole walls. In some embodiments, where the tip section 12 is a solid pole, the needle 32 can puncture the distal end 26. Before, during, or after puncturing, glue can be added for extra support. In certain embodiments, the needle 32 can be inserted and crimped into place with or without a sleeve as will be discussed further below.

Figure 4:
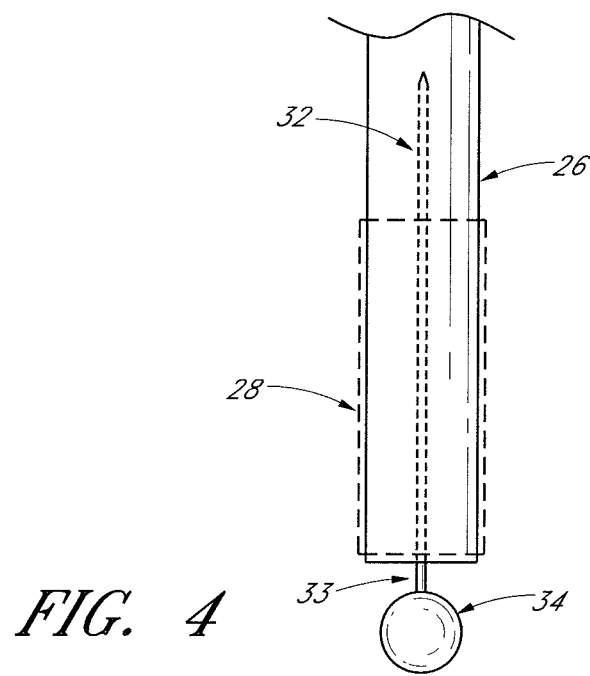
FIG. 4 illustrates a sleeve wrapping the pin and the rod.

FIG. 4 illustrates, for some embodiments, another step in the method of assembly for forming the distal end connection 16. As shown in FIG. 4, after the pin 33 is inserted into the tip section 12, a sleeve 28 can be slipped onto the distal end 26. The sleeve 28 can also be slipped on before the pin 33 is inserted.

Figure 5:
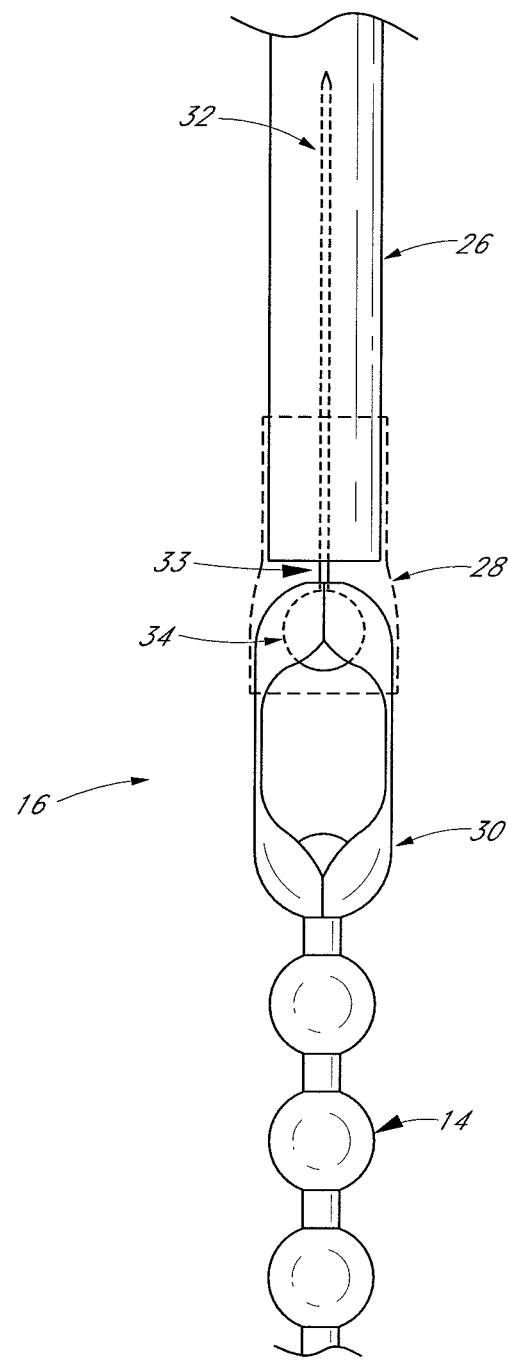
FIG. 5 illustrates the connection between the pin and the rod with the sleeve securing the connection.

FIG. 5 illustrates, for some embodiments, another step in the method of assembly for forming the distal end connection 16. As shown in FIG. 5, the beaded chain connector 30 can slip onto the head 34 of the pin 33. The sleeve 28 can then be slipped down over the beaded chain connector 30 so that the head 34 of the pin 33 is covered. The sleeve can then be secured as described below for the various types of sleeves 28.

In certain embodiments, the sleeve 28 can be a heat shrink sleeve. A heat shrink sleeve can be formed of material that shrinks upon the application of heat. This can allow for securing the distal end connection 16 with relative ease by applying heat once the heat shrink sleeve is in the desired position over the distal end 26 and beaded chain connector 30.

In other embodiments, the sleeve 28 can be of tape, of spiral-wound malleable wire, or a hollow malleable metal cylinder. In some embodiments, where the sleeve 28 is tape, the tape can be wound over the distal end 26 and the beaded chain connector 30 to secure the distal end connection 16. In some embodiments, with spiral-wound malleable wire, the wire can either be wound more tightly or crimped using a similar method as for a hollow malleable metal cylinder described in the below paragraph.

In an embodiment with a hollow malleable metal cylinder, the metal cylinder can be crimped into place. A hollow malleable metal cylinder can be formed of material that deforms upon the application of force and retains its shape afterwards. Similar to the heat shrink sleeve discussed above, a metal cylinder that is crimped can allow for securing the distal end connection 16 with relative ease by applying force once the metal cylinder is in the desired position over the distal end 26 and beaded chain connector 30. The force, for example, can be applied by using pliers, other similar instruments, or a machine.

The above-discussed types of the distal end connection 16 can secure the flexible line member 14 to the distal end 26 internally via a needle 32 as well as externally via a sleeve 28. Other embodiments can forgo a sleeve 28 altogether and crimp the needle 32 into place by the application of force, which deforms the corresponding section of the distal end 26. In some embodiments, including without a sleeve 28, the distal end 26 can be of material that deforms upon the application of force and retains its shape afterwards. In some embodiments, foregoing a sleeve 28, the needle 32 can just be glued into place as discussed above.

While not illustrated, similar connections to the types described above can be used to attach the toy object 20 to the flexible line member 14 to form the toy object and flexible line member connection 18. Other embodiments can employ other toy object and flexible line member connections 18 such as gluing the flexible line member 14 to the toy object 20 or passing the flexible line member 14 through the toy object 20 in a secure manner.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:
1. A pet toy comprising:
   a rod having a proximal end and a distal end, the rod becoming increasingly flexible from the proximal end to the distal end; and
   a flexible line member connected to the distal end via a connection, the connection between the distal end and the flexible line member comprising:
      a pin with a needle portion and a head portion, wherein the needle portion is at least partially inserted into the distal end; and
      a connector on an end of the flexible line member, the connector mounted on the head portion to connect the flexible line member to the rod.
2. The pet toy of claim 1, wherein a ratio of a length of the rod to a length of the flexible line member is from about 5:1 to about 50:1.

3. The pet toy of claim 1, wherein the flexible line member comprises a beaded chain configured to allow 360° freedom of rotation.

4. The pet toy of claim 1, further comprising a sleeve covering at least a portion of the distal end and at least a portion of the connector to secure the connection between the distal end and the flexible line member.

5. A pet toy comprising:
a flexible rod having a proximal end and a distal end, the rod configured to form substantially an arcuate shape when the proximal end is positioned substantially vertically such that the distal end is substantially horizontally level with the proximal end,
a flexible line member connected at a first end to the distal end via a connection; and
a toy object connected to a second end of the flexible line member,
wherein the rod becomes less rigid from the proximal end to the distal end such that the toy object connected to the flexible line member mimics unpredictable motion when the proximal end is waived.

6. The pet toy of claim 5, wherein the connection between the distal end and the flexible line member comprises:
a pin with a needle portion and a head portion, wherein the needle portion is at least partially inserted into the distal end; and
a connector on the first end of the flexible line member, the connector mounted on the head portion to connect the flexible line member to the rod.

7. The pet toy of claim 5, wherein the cross-sectional diameter of the rod decreases from the proximal end to the distal end.

8. The pet toy of claim 7, wherein the decrease in cross-sectional diameter comprises one or more step changes.

9. The pet toy of claim 5, wherein the rod comprises a flexible polymer material.

10. The pet toy of claim 5, wherein a middle portion of the rod between the proximal end and the distal end is more arcuate than portions of the rod at or near the proximal and distal ends when the proximal end is positioned substantially vertically such that the distal end is substantially horizontally level with the proximal end.

11. A pet toy comprising:
a rod having a proximal end and a distal end;
a plurality of sections, the rod comprising the plurality of sections decreasing in cross-sectional diameter from the proximal end to the distal end such that the rod becomes increasingly flexible from the proximal end to the distal end; and
a flexible line member connected to the distal end,
wherein at least a first of the plurality of sections has a shorter length relative to at least a second of the plurality of sections, the first of the plurality of sections positioned closer to the proximal end than the second of the plurality of sections.

12. The pet toy of claim 11, wherein a connection between the distal end and the flexible line member comprises:
a pin with a needle portion and a head portion, wherein the needle portion is at least partially inserted into the distal end portion; and
a connector connected to the flexible line member, the connector mounted on the head portion to connect the flexible line member to the rod.

13. The pet toy of claim 11, further comprising an object connected to the flexible line member.

14. The pet toy of claim 13, wherein flexible line member is configured such that the object can freely spin about an axis of the object.

15. The pet toy of claim 11, further comprising at least two separable sections of the plurality of sections such that the sections can be separated to disassemble the rod.

16. The pet toy of claim 15, further comprising an elastic cord disposed along at least a part of a length of the rod such that the at least two separable sections are held together when the rod is assembled and the at least two separable sections are held in proximity to each other when the rod is disassembled.

17. The pet toy of claim 11, further comprising a tie wrap at or near the proximal end, the tie wrap configured to wrap around at least one of the plurality of sections to secure the at least one of the plurality of sections at or near the proximal end.

18. The pet toy of claim 11, wherein the plurality of sections comprises a base section including the proximal end, a tip section including the distal end, and a midsection between the base section and the tip section.

19. The pet toy of claim 18, wherein the tip section is at least a fourth of an overall length of the rod.

20. The pet toy of claim 18, wherein the base section and the midsection are about equal in lengths.

21. The pet toy of claim 18, wherein the base section has a larger cross-sectional diameter than the midsection, and wherein the midsection has a larger cross-sectional diameter than the tip section.

\* \* \* \* \*

UNITED STATES PATENT AND TRADEMARK OFFICE
CERTIFICATE OF CORRECTION

| | |
|---|---|
| PATENT NO. | : 8,978,591 B2 |
| APPLICATION NO. | : 13/919858 |
| DATED | : March 17, 2015 |
| INVENTOR(S) | : Jesse G. Cogswell |

It is certified that error appears in the above-identified patent and that said Letters Patent is hereby corrected as shown below:

In the specification,

In column 1 at line 35, Change "pet to" to --pet toy--.

In column 7 at line 4, Change "thereof" to --thereof.--.

Signed and Sealed this
Eighth Day of December, 2015

Michelle K. Lee
*Director of the United States Patent and Trademark Office*